United States Patent
Mwanje et al.

(10) Patent No.: US 11,589,302 B2
(45) Date of Patent: Feb. 21, 2023

(54) CONFIGURATION OF POWER SAVING GROUPS

(71) Applicant: Nokia Technologies Oy, Espoo (FI)

(72) Inventors: Stephen Mwanje, Dorfen (DE); Janne Tapio Ali-Tolppa, Taufkirchen (DE)

(73) Assignee: Nokia Technologies Oy, Espoo (FI)

( * ) Notice: Subject to any disclaimer, the term of this patent is extended or adjusted under 35 U.S.C. 154(b) by 162 days.

(21) Appl. No.: 16/973,685

(22) PCT Filed: Jun. 13, 2018

(86) PCT No.: PCT/EP2018/065709
§ 371 (c)(1),
(2) Date: Dec. 9, 2020

(87) PCT Pub. No.: WO2019/238227
PCT Pub. Date: Dec. 19, 2019

(65) Prior Publication Data
US 2021/0258873 A1    Aug. 19, 2021

(51) Int. Cl.
H04W 52/02    (2009.01)

(52) U.S. Cl.
CPC ............................ H04W 52/0206 (2013.01)

(58) Field of Classification Search
CPC ......................... H04W 52/0206; Y02D 30/70
See application file for complete search history.

(56) References Cited

U.S. PATENT DOCUMENTS

| 10,531,379 | B2 * | 1/2020 | Chou | .................. | H04W 24/08 |
| 2013/0324132 | A1 * | 12/2013 | Morad | .............. | H04W 52/0203 |
| | | | | | 455/438 |

(Continued)

FOREIGN PATENT DOCUMENTS

| WO | 2018/093397 A1 | 5/2018 |
| WO | 2019/096399 A1 | 5/2019 |

OTHER PUBLICATIONS

Mwanje et al., "Distributed Energy Saving Management in Multi-Layer 4G/5G Ultra-Dense Networks", IEEE Wireless Communications and Networking Conference Workshops (WCNCW), Apr. 15-18, 2018, pp. 143-148.

(Continued)

Primary Examiner — Charles N Appiah
Assistant Examiner — Nicole M Louis-Fils
(74) Attorney, Agent, or Firm — Nokia Technologies Oy

(57) ABSTRACT

There are provided measures for configuration of power saving groups. Such measures, for determining, in a network including a plurality of radio cells, at least one power saving group comprising at least two radio cells of said plurality of radio cells, exemplarily comprise retrieving neighboring data including a plurality of entries corresponding to a plurality of combinations of respective two radio cells of said plurality of radio cells, wherein each of said plurality of entries represents overlapping amount information in relation to said respective two radio cells, identifying radio cells of said plurality of radio cells as power saving group reference cells based on said neighboring data, identifying radio cells of said plurality of radio cells as power saving group helping cells respectively for at least one identified power saving group reference cell based on said neighboring data, and assigning each of said identified power saving group helping cells to one of said identified power saving group reference cells based on said neighboring data, wherein each of said at least one power saving group comprises one of said identified power saving group reference cells and at least one identified power saving group helping cell assigned to said one of said identified power saving group reference cells.

15 Claims, 8 Drawing Sheets

(56) References Cited

U.S. PATENT DOCUMENTS

| | | | |
|---|---|---|---|
| 2014/0051419 A1* | 2/2014 | Brend | H04W 52/0206 |
| | | | 455/418 |
| 2016/0066236 A1* | 3/2016 | Comstock | H04W 16/24 |
| | | | 370/331 |
| 2017/0041870 A1* | 2/2017 | Chen | H04W 52/0206 |

OTHER PUBLICATIONS

Mwanje et al., "Fluid Capacity for Energy Saving Management in Multi-Layer Ultra-Dense 4G/5G Cellular Networks", 12th International Conference on Network and Service Management (CNSM), Oct. 31-Nov. 4, 2016, pp. 233-237.

International Search Report and Written Opinion received for corresponding Patent Cooperation Treaty Application No. PCT/EP2018/065709, dated Feb. 12, 2019, 13 pages.

Office action received for corresponding European Patent Application No. 18732710.1, dated Jul. 20, 2022, 5 pages.

\* cited by examiner

CONFIGURATION OF POWER SAVING GROUPS

RELATED APPLICATION

This application was originally filed as Patent Cooperation Treaty Application No. PCT/EP2018/065709 filed Jun. 13, 2018, which is hereby incorporated in its entirety.

FIELD

The present invention relates to configuration of power saving groups. More specifically, the present invention exemplarily relates to measures (including methods, apparatuses and computer program products) for realizing configuration of power saving groups. In more detail, the present invention relates to management and realization of Energy Saving (ES) in multi-vendor heterogeneous networks (HetNets) in $3^{rd}$ Generation Partnership Project (3GPP) 4G/5G, and more particularly to automated configuration of power saving groups in heterogeneous networks.

BACKGROUND

Example heterogeneous networks are introduced with reference to FIG. 5.

FIG. 5 illustrates an example Multi-layer, multi-RAT Ultra Dense Network. Macro cells A, B1 and B2 could be in an older radio access technology (RAT) (e.g. 3G), while micro/pico cells (C, D, E, H) could be Long Term Evolution (LTE) and/or 5G, and the beam forming cells (F) are in 5G new radio.

Generally, such heterogeneous networks are characterized by cells deployed in multiple network or radio layers and by a blurred coverage-capacity boundary in that some small cells are so crucial that they are important as coverage cells.

Namely, with respect to the cells deployed in multiple network or radio layers, network layers with at least one macro layer (e.g. 3G and/or LTE/A) and multiple small (micro/pico/etc.) cell helper layers and with multiple radio interfaces (B6G, cm wave and/or mm wave) in a single base station/eNB are provided.

Further, with respect to the blurred coverage-capacity boundary, the distinction among layers is ambiguous in that macro cells and pico cells could be different radio access technologies (RAT) e.g. respectively 3G, LTE/A or new 5G radios and it is no longer trivial to distinguish between macro coverage layers and capacity or helper layers.

For Energy Savings Management (ESM) through deactivation of cells during periods of low traffic, it is necessary that the cells are grouped together, into a power saving group (PSG), created in such a way that when one cell is deactivated, the other cells in the group are able to cover the area—i.e. there should be no loss of coverage.

The PSG concept includes grouping cells into groups, among which some cells can be deactivated without loss of coverage. Such a group has one cell, called the reference cell, as the one primarily responsible for coverage (thus also called coverage cell) so that all the others, called helper cells, are only available to reinforce the capacity (thus also called capacity cell) in the area.

The PSG concept assumes that cells have been grouped in a way that each cell belongs to exactly one PSG. For example, one LTE carrier could be the reference cell, with all other cells (be it LTE or 5G) could be helper cells. The PSG concept is also applicable to older technologies (2G and 3G) but using a centralized ESM solution. This invention is applicable to both the new technologies LTE and 5G and future network technologies as well as the mentioned older technologies.

Previously, solutions for ESM have focussed on how energy savings should be realized. They typically assumed that the operator has organized the cells into PSGs so that the solution only needs to figure out the sequence in which cells should be activated or deactivated.

Power saving groups may be elaborated based on relationships among respective cells.

A cell proximity coupling (CPC) concept describes such relationship among cells. For any two cells A and B, the CPC describes the percentage to which the geographical coverage of the target cell (e.g. B) overlaps with that of the source cell (e.g. A). Since the two cells may be of different sizes, the CPC (as seen from each cell) will not necessarily be symmetric.

For example, a network shown in FIG. 7 (illustrating an example evaluation of neighborliness of three cells) is considered. The network shown in FIG. 7 has the macro cell A with three possible neighbor sites: two LTE outdoor sites C and D, a set of a 5G indoor cells E, and 5G beamforming outdoor site F. According to certain calculation instructions, the CPCs for this exemplary network may be computed from deployment data of the respective sites with a resulting CPC matrix that is similar to the following table.

| Cls | A | B1 | B2 | C1 | C2 | C3 | D1 | D2 | D3 | E1 | E2 | E3 | F1 | F2 | F3 | G1 | G2 | H |
|---|---|---|---|---|---|---|---|---|---|---|---|---|---|---|---|---|---|---|
| A | — | 28 | 23 | 12 | 21 | 20 | 17 | 5 | 17 | 12 | 12 | 12 | 16 | 15 | 19 | 11 | 11 | 23 |
| B1 | 28 | — | 7 | — | — | — | 25 | 25 | 21 | — | — | — | 19 | 19 | 12 | — | — | — |
| B2 | 23 | 7 | — | 12 | 17 | 5 | 2 | — | — | 9 | 9 | 9 | 19 | 13 | 19 | 12 | 12 | 38 |
| C1 | 48 | — | 47 | — | 14 | 14 | — | — | — | — | — | — | — | — | — | — | — | — |
| C2 | 84 | — | 66 | 14 | — | 14 | — | — | — | — | — | — | — | — | — | — | — | — |
| C3 | 78 | — | 21 | 14 | 14 | — | — | — | — | 28 | 28 | 28 | — | — | — | — | — | — |
| D1 | 68 | 100 | 9 | — | — | — | — | 31 | 31 | — | — | — | 1 | 36 | 17 | — | — | 10 |
| D2 | 20 | 100 | — | — | — | — | 31 | — | 31 | — | — | — | — | 7 | — | — | — | — |
| D3 | 66 | 82 | — | — | — | — | 31 | 31 | — | — | — | — | — | — | — | — | — | — |
| E1 | 100 | — | 75 | — | — | 55 | — | — | — | — | 100 | 100 | — | — | — | — | — | — |
| E2 | 100 | — | 75 | — | — | 55 | — | — | — | 100 | — | 100 | — | — | — | — | — | — |
| E3 | 100 | — | 75 | — | — | 55 | — | — | — | 100 | 100 | — | — | — | — | — | — | — |
| F1 | 85 | 100 | 100 | — | — | — | 1 | — | — | — | — | — | — | 31 | 31 | — | — | 29 |
| F2 | 78 | 100 | 70 | — | — | — | 47 | 9 | — | — | — | — | 31 | — | 31 | — | — | 11 |
| F3 | 100 | 62 | 100 | — | — | — | 22 | — | — | — | — | — | 31 | 31 | — | — | — | 55 |
| G1 | 85 | — | 100 | — | — | — | — | — | — | — | — | — | — | — | — | — | 100 | 100 |
| G2 | 85 | — | 100 | — | — | — | — | — | — | — | — | — | — | — | — | 100 | — | 100 |
| H | 46 | — | 76 | — | — | — | 5 | — | — | — | — | — | 11 | 4 | 20 | 25 | 25 | — |

The CPC might be used to configure PSGs.

However, the configuration of power saving groups whether based on the CPC or not is complex and not straight forward and can be too involving in particular for highly dense networks. In particular, for multi-RAT scenarios without a clear distinction between coverage and capacity cells, the selection of a cell to either be the reference for a PSG or to be helper in another PSG may need to be reconfigured depending on network situations and this requires a dynamic flexible/reconfigurable automated approach.

Hence, the problem arises that automatic elaboration of PSGs including an assignment of cells to become reference cells or helper cells for respective PSGs (cell layers) based on conditions of the network in question and without making intervention by the operator necessary is to be provided for.

Hence, there is a need to provide for configuration of power saving groups.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method for determining, in a network including a plurality of radio cells, at least one power saving group comprising at least two radio cells of said plurality of radio cells, the method comprising retrieving neighboring data including a plurality of entries corresponding to a plurality of combinations of respective two radio cells of said plurality of radio cells, wherein each of said plurality of entries represents overlapping amount information in relation to said respective two radio cells, identifying radio cells of said plurality of radio cells as power saving group reference cells based on said neighboring data, identifying radio cells of said plurality of radio cells as power saving group helping cells respectively for at least one identified power saving group reference cell based on said neighboring data, and assigning each of said identified power saving group helping cells to one of said identified power saving group reference cells based on said neighboring data, wherein each of said at least one power saving group comprises one of said identified power saving group reference cells and at least one identified power saving group helping cell assigned to said one of said identified power saving group reference cells.

According to an exemplary aspect of the present invention, there is provided an apparatus for determining, in a network including a plurality of radio cells, at least one power saving group comprising at least two radio cells of said plurality of radio cells, the apparatus comprising at least one processor, at least one memory including computer program code, and at least one interface configured for communication with at least another apparatus, the at least one processor, with the at least one memory and the computer program code, being configured to cause the apparatus to perform retrieving neighboring data including a plurality of entries corresponding to a plurality of combinations of respective two radio cells of said plurality of radio cells, wherein each of said plurality of entries represents overlapping amount information in relation to said respective two radio cells, identifying radio cells of said plurality of radio cells as power saving group reference cells based on said neighboring data, identifying radio cells of said plurality of radio cells as power saving group helping cells respectively for at least one identified power saving group reference cell based on said neighboring data, and assigning each of said identified power saving group helping cells to one of said identified power saving group reference cells based on said neighboring data, wherein each of said at least one power saving group comprises one of said identified power saving group reference cells and at least one identified power saving group helping cell assigned to said one of said identified power saving group reference cells.

According to an exemplary aspect of the present invention, there is provided an apparatus for determining, in a network including a plurality of radio cells, at least one power saving group comprising at least two radio cells of said plurality of radio cells, the apparatus comprising retrieving circuitry configured to retrieve neighboring data including a plurality of entries corresponding to a plurality of combinations of respective two radio cells of said plurality of radio cells, wherein each of said plurality of entries represents overlapping amount information in relation to said respective two radio cells, identifying circuitry configured to identify radio cells of said plurality of radio cells as power saving group reference cells based on said neighboring data, and to identify radio cells of said plurality of radio cells as power saving group helping cells respectively for at least one identified power saving group reference cell based on said neighboring data, and assigning circuitry configured to assign each of said identified power saving group helping cells to one of said identified power saving group reference cells based on said neighboring data, wherein each of said at least one power saving group comprises one of said identified power saving group reference cells and at least one identified power saving group helping cell assigned to said one of said identified power saving group reference cells.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient determination of power saving groups to thereby solve at least part of the problems and drawbacks identified in relation to the prior art. In particular, any one of the above aspects removes the constraint/need to preconfigure the cell layers before PSGs are autoconfigured.

By way of exemplary embodiments of the present invention, there is provided configuration of power saving groups. More specifically, by way of exemplary embodiments of the present invention, there are provided measures and mechanisms for realizing configuration of power saving groups.

Thus, improvement is achieved by methods, apparatuses and computer program products enabling/realizing configuration of power saving groups.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
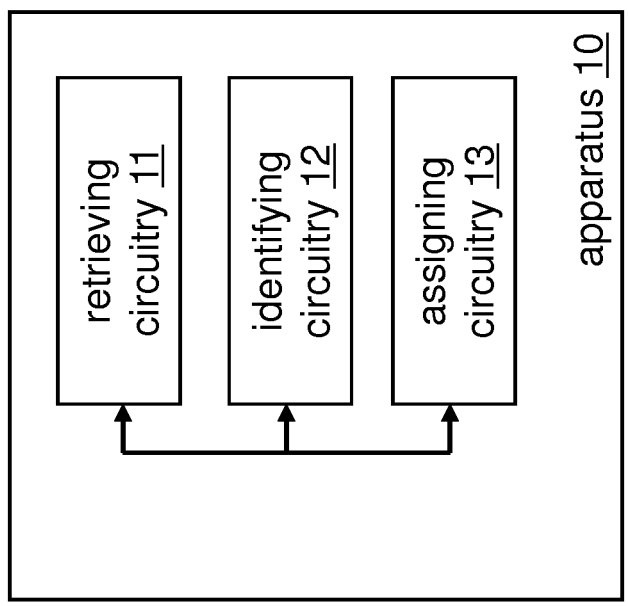
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) configuration of power saving groups.

As mentioned above, the configuration of power saving groups is not that obvious. Exemplary embodiments of the present invention provide mechanisms for such automated configuration and/or reconfiguration.

The above-discussed CPC might be used to configure PSGs. Specifically, if the cell layers are defined (i.e. cell A is clearly defined as the reference macro cell and the others as helper cells), the PSG for each macro/reference cell may be computed as the group of helper cells for which the CPC values as seen from the macro are positive and above some threshold.

However, as described above, manually configuring cell layers is not trivial and can be too involving for some highly dense networks. For multi-RAT scenarios without a clear distinction between coverage and capacity cells, the selection of a cell to either be the reference for a PSG or to be helper in another PSG becomes a configurable parameter. Correspondingly, the association of cells to layers and PSGs may need to be reconfigured depending on network situations and this requires a dynamic flexible/reconfigurable automated solution, which is proposed according to exemplary embodiments of the present invention.

FIG. 1 is a block diagram illustrating an apparatus according to exemplary embodiments of the present invention. The apparatus for determining, in a network including a plurality of radio cells, at least one power saving group comprising at least two radio cells of said plurality of radio cells, may be network node 10 in the network or any other equipment connected or connectable to the network, and the apparatus 10 comprises receiving circuitry 11, identifying circuitry 12, and assigning circuitry 13.

The retrieving circuitry 11 retrieves neighboring data including a plurality of entries corresponding to a plurality of combinations of respective two radio cells of said plurality of radio cells, wherein each of said plurality of entries represents overlapping amount information in relation to said respective two radio cells. The identifying circuitry 12 identifies radio cells of said plurality of radio cells as power saving group reference cells based on said neighboring data. The identifying circuitry 12 further identifies radio cells of said plurality of radio cells as power saving group helping cells respectively for at least one identified power saving group reference cell based on said neighboring data. The assigning circuitry 13 assigns each of said identified power saving group helping cells to one of said identified power saving group reference cells based on said neighboring data. Each of said at least one power saving group comprises one of said identified power saving group reference cells and at least one identified power saving group helping cell assigned to said one of said identified power saving group reference cells.

Figure 3:
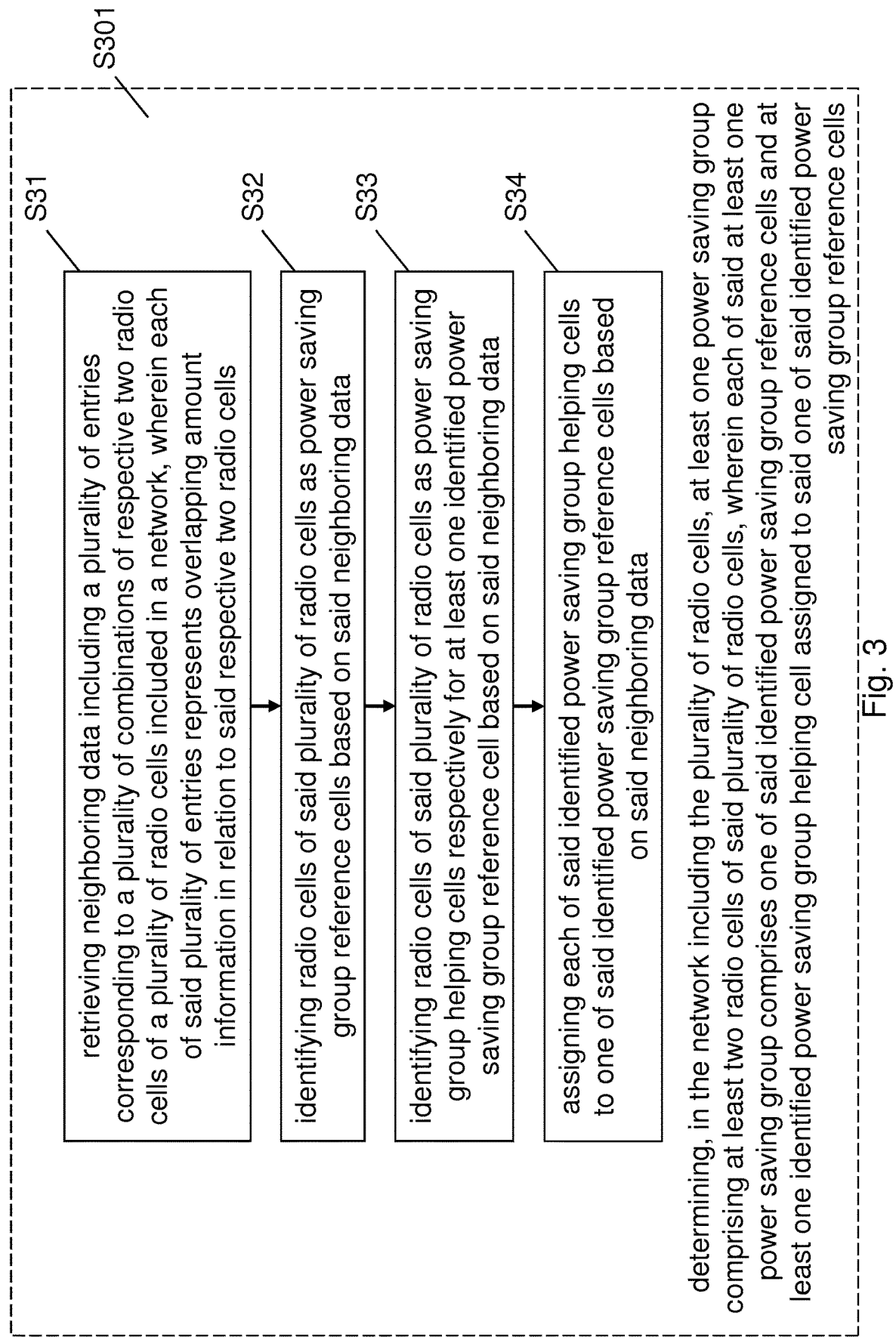
FIG. 3 is a schematic diagram of a procedure according to exemplary embodiments of the present invention.

FIG. 3 is a schematic diagram of a procedure according to exemplary embodiments of the present invention. The apparatus according to FIG. 1 may perform the method of FIG. 3 but is not limited to this method. The method of FIG. 3 may be performed by the apparatus of FIG. 1 but is not limited to being performed by this apparatus.

As shown in FIG. 3, a procedure of determining (S301), in a network including a plurality of radio cells, at least one power saving group comprising at least two radio cells of said plurality of radio cells according to exemplary embodiments of the present invention comprises an operation of retrieving (S31) neighboring data including a plurality of entries corresponding to a plurality of combinations of respective two radio cells of said plurality of radio cells, wherein each of said plurality of entries represents overlapping amount information in relation to said respective two radio cells, an operation of identifying (S32) radio cells of said plurality of radio cells as power saving group reference cells based on said neighboring data, an operation of identifying (S33) radio cells of said plurality of radio cells as power saving group helping cells respectively for at least one identified power saving group reference cell based on said neighboring data, and an operation of assigning (S34) each of said identified power saving group helping cells to one of said identified power saving group reference cells based on said neighboring data. Each of said at least one power saving group comprises one of said identified power saving group reference cells and at least one identified power saving group helping cell assigned to said one of said identified power saving group reference cells.

Figure 2:
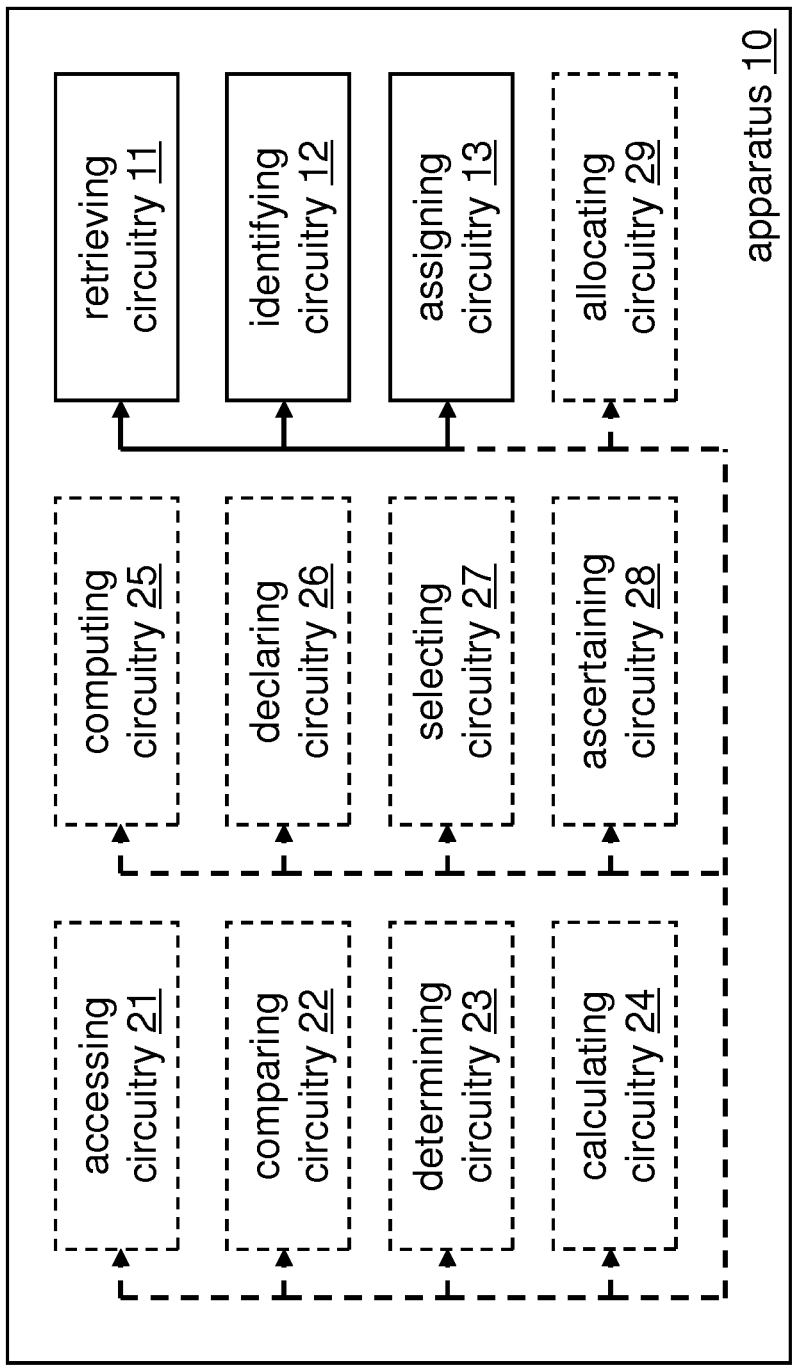
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise accessing circuitry 21, comparing circuitry 22, determining circuitry 23, calculating circuitry 24, computing circuitry 25, declaring circuitry 26, selecting circuitry 27, ascertaining circuitry 28, and/or ascertaining circuitry 29.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 3, exemplary details of the retrieving operation (S31) are given, which are inherently independent from each other as such.

Such exemplary retrieving operation (S31) according to exemplary embodiments of the present invention may comprise an operation of accessing said neighboring data stored in a storing unit.

According to a variation of the procedure shown in FIG. 3, exemplary additional operations are given, which are inherently independent from each other as such. According to such variation, an exemplary method according to exemplary embodiments of the present invention may comprise an operation of comparing, for each pair of two radio cells, each of two overlapping amount information elements corresponding to the respective pair of two radio cells with a neighborhood determination threshold (ThN), and an operation of determining, if at least one of said two overlapping amount information elements is larger than said neighborhood determination threshold, said respective two radio cells as neighbor radio cells.

According to a variation of the procedure shown in FIG. 3, exemplary additional operations are given, which are inherently independent from each other as such. According to such variation, an exemplary method according to exemplary embodiments of the present invention may comprise an operation of calculating, for each pair of two neighbor radio cells, an absolute value of a difference between the two overlapping amount information elements corresponding to the respective pair of two neighbor radio cells as an overlapping amount difference, an operation of comparing, for each pair of two neighbor radio cells, said respective overlapping amount difference with a power saving candidate determination threshold, and an operation of determining, if said respective overlapping amount difference is larger than said power saving candidate determination threshold, said respective two neighbor radio cells as power saving candidate radio cells.

According to a variation of the procedure shown in FIG. 3, exemplary additional operations are given, which are inherently independent from each other as such. According to such variation, an exemplary method according to exemplary embodiments of the present invention may comprise an operation of determining, for each pair of two power saving candidate radio cells, a maximum overlapping amount information element of the two overlapping amount information elements corresponding to the respective pair of two power saving candidate radio cells, an operation of computing a sum of the respective maximum overlapping amount information element and the respective overlapping amount difference as an overlapping amount gradient, an operation of comparing the respective overlapping amount gradient with a power saving group candidate determination threshold (ThG), and an operation of determining, if said respective overlapping amount gradient is larger than said power saving group candidate determination threshold, said respective two neighbor radio cells as power saving group candidate radio cells.

According to a variation of the procedure shown in FIG. 3, exemplary additional operations are given, which are inherently independent from each other as such. According to such variation, an exemplary method according to exemplary embodiments of the present invention may comprise an operation of declaring, for each pair of two power saving group candidate radio cells, the power saving group candidate radio cell corresponding to the larger overlapping amount information element of the respective two overlapping amount information elements as a power saving group reference cell candidate of said respective pair of two power saving group candidate radio cells and the power saving group candidate radio cell corresponding to the smaller overlapping amount information element of the respective two overlapping amount information elements as a power saving group helping cell candidate of said respective pair of two power saving group candidate radio cells.

According to a variation of the procedure shown in FIG. 3, exemplary details of the identifying operation (S32) are given, which are inherently independent from each other as such.

Such exemplary identifying operation (S32) according to exemplary embodiments of the present invention may comprise an operation of selecting, from power saving group reference cell candidates, power saving group candidate radio cells which are not declared as a power saving group helping cell candidate of any pair of two power saving group candidate radio cells, as a power saving group reference cell.

According to a variation of the procedure shown in FIG. 3, exemplary details of the identifying operation (S33) are given, which are inherently independent from each other as such.

Such exemplary identifying operation (S33) according to exemplary embodiments of the present invention may comprise an operation of selecting power saving group candidate radio cells which are not selected as a power saving group reference cell as a power saving group helping cell of said respective pair of two power saving group candidate radio cells.

According to a variation of the procedure shown in FIG. 3, exemplary details of the assigning operation (S34) are given, which are inherently independent from each other as such.

Such exemplary assigning operation (S34) according to exemplary embodiments of the present invention may comprise an operation of ascertaining, for each power saving group helping cell, the power saving group reference cell corresponding to the pair of said respective power saving group helping cell and said respective power saving group reference cell for which the computed overlapping amount gradient is highest, and an operation of allocating said respective power saving group helping cell to said ascertained power saving group reference cell.

According to a variation of the procedure shown in FIG. 3, exemplary details of the ascertaining operation are given, which are inherently independent from each other as such.

Such exemplary ascertaining operation according to exemplary embodiments of the present invention may comprise an operation of declaring, if there are more than one pair of said respective power saving group helping cell and respective power saving group reference cells having the same highest computed overlapping amount gradient, the power saving group reference cell corresponding to one pair of the more than one pair of said respective power saving group helping cell and said respective power saving group reference cells having the same highest computed overlapping amount gradient based on at least one of

- a random determination,
- a number of power saving group helping cells associated with each of the respective power saving group reference cells of the more than one pair of said respective power saving group helping cell and said respective power saving group reference cells having the same highest computed overlapping amount gradient, and
- a traffic load expected for each of the respective power saving group reference cells of the more than one pair of said respective power saving group helping cell and said respective power saving group reference cells having the same highest computed overlapping amount gradient.

According to further exemplary embodiments of the present invention, said overlapping amount information is indicative of a portion of a geographical coverage of one cell of said respective two radio cells which is overlapped with a geographical coverage of the other cell of said respective two radio cells.

According to still further exemplary embodiments of the present invention, said overlapping amount information is determined based on at least one of respective locations of said respective two radio cells, respective azimuths of said respective two radio cells, respective ranges of said respective two radio cells, respective antenna heights of said respective two radio cells, and respective transmit powers of said respective two radio cells.

As mentioned above, exemplary embodiments of the present invention thus remove the constraint/need to pre-configure the cell layers before PSGs are autoconfigured. In other words, the PSGs can be derived even when only the CPCs (or in more general terms neighboring data including a plurality of entries corresponding to a plurality of combinations of respective two radio cells of said plurality of radio cells, wherein each of said plurality of entries represents overlapping amount information in relation to said respective two radio cells) are provided.

Therefore, in more specific terms, given a matrix of CPCs, a PSG autoconfigurator according to exemplary embodiments of the present invention creates a list of PSGs where each PSG has one reference cell $R_i$ and a set of helper (helping) cells $h^i_j$ that can be deactivated to reduce energy consumption during low load periods.

Figure 6:
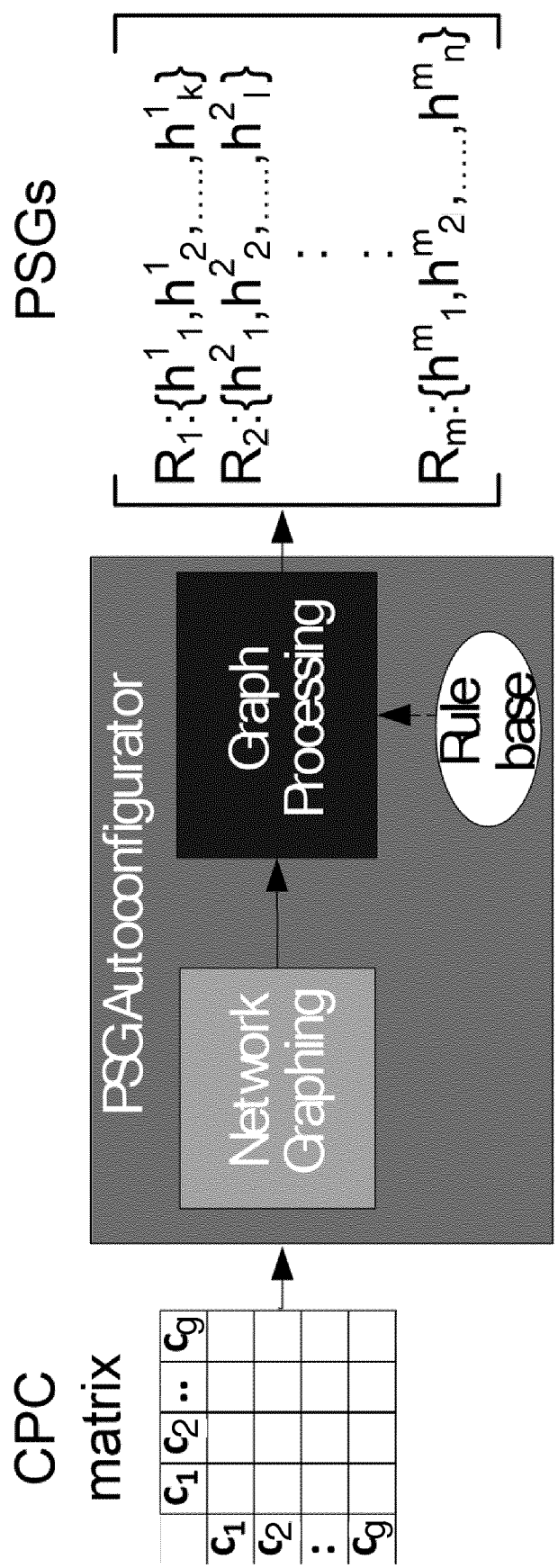
FIG. 6 shows a schematic diagram illustrating components of the power saving group determination according to exemplary embodiments of the present invention.

FIG. 6 shows a schematic diagram illustrating components of the power saving group determination according to exemplary embodiments of the present invention. As is derivable from FIG. 6, the matrix of CPCs is input to the PSG autoconfigurator according to exemplary embodiments of the present invention, and PSGs generated based thereon are output.

The (re-)configuration process involves two processes, namely a determination of a network representation (which may be a network graph, such that according to exemplary embodiments of the present invention the determination of the network representation may be a network graphing) and a processing of the network representation (which may, if the network representation is a network graph, according to exemplary embodiments of the present invention, a graph processing). According to exemplary embodiments of the present invention, the processing of the network representation is rule based.

Figure 4:
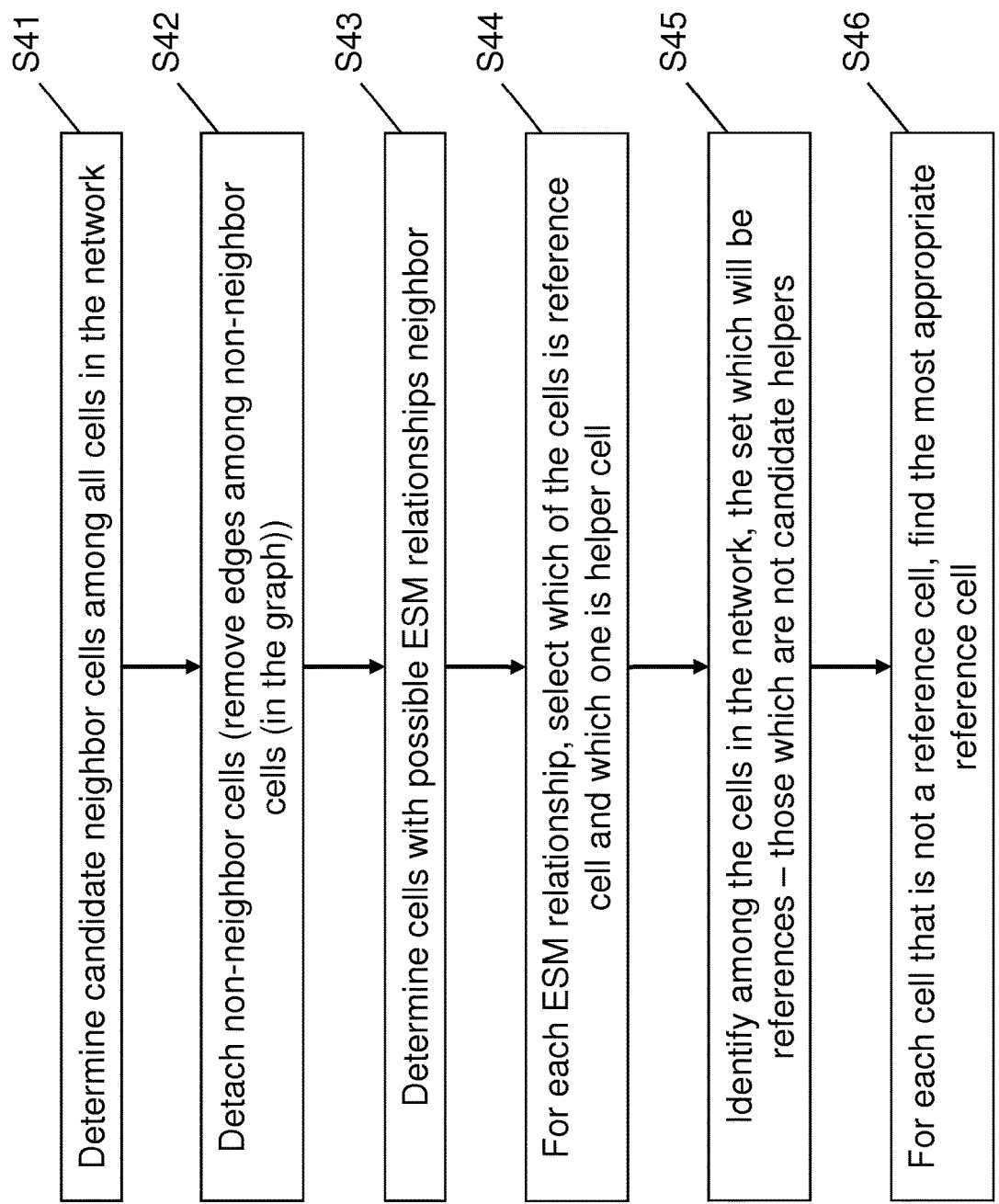
FIG. 4 is a schematic diagram of a procedure according to exemplary embodiments of the present invention.
Figure 5:
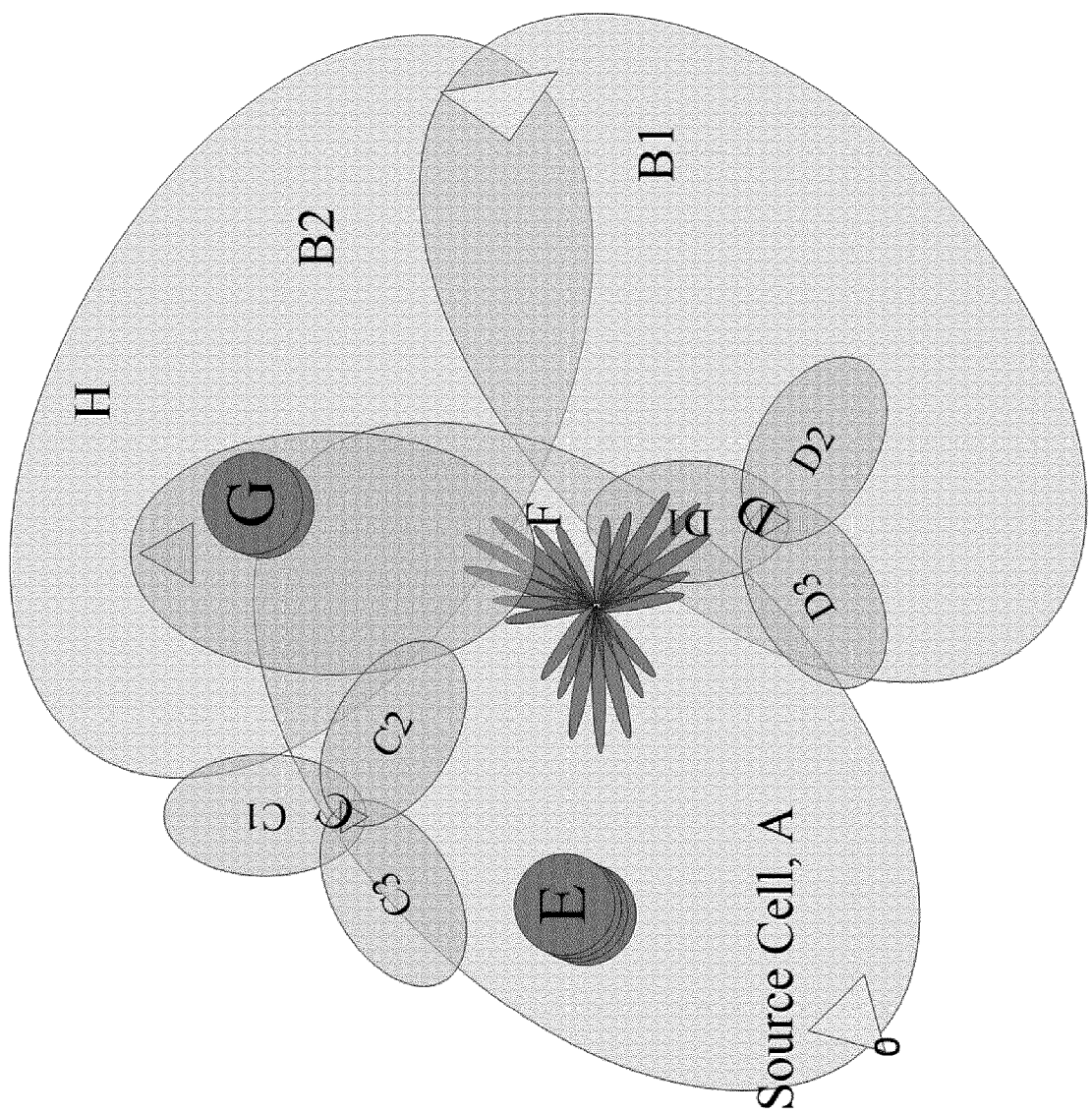
FIG. 5 shows a schematic diagram illustrating an example of heterogeneous networks.

FIG. 4 is a schematic diagram of a procedure according to exemplary embodiments of the present invention. The mentioned two processes together are equivalent to FIG. 4 (illustrating a flow chart of a PSG autoconfiguration process according to exemplary embodiments of the present invention).

According to exemplary embodiments of the present invention, the network graphical component creates a graph (in general, a representation) of the network, which is then processed to identify the reference cells and their respective helper cells. The (graph) processing essentially decouples non-related cells to identify 1. the pairs of cells that have neighbor relationships,
2. neighbor cells that have ESM relationships—i.e. one could carry a significant portion of the other cell's load (more than just neighbor relationship),
3. the cells, among those given, that can be considered as reference cells, and
4. the cells, among those that are not reference cells, which should be helpers (helper/helping cells) to each identified reference cell.

As mentioned above, the (re-)configuration involves two processes, namely a determination of a network representation (network graphing) and a processing of the network representation (graph processing).

According to exemplary embodiments of the present invention, the determination of a network representation (network graphing) comprises computing a graph (representation) of the network or subnetwork using the CPCs. In particular, a directed graph may be created with the cells as nodes having two directed edges between every two nodes. The size of each edge represents the CPC, while the direction represents the relationship. For example, an edge A→x→B represents the statement that "A overlaps B by at most x %".

Further, according to exemplary embodiments of the present invention, the processing of the network representation is rule based and in particular comprises trimming the graph to disconnect the nodes using a set of rules. The rules that trim/decouple cells may be applied until the smallest groups of closely coupled cells that form the PSGs. As a result, each eventual small connected subgraph may represent a PSG.

According to exemplary embodiments of the present invention, the following rules are applied:

According to a Rule 1, two cells are considered as candidates for inclusion into a PSG if they are neighbors to each other, i.e. their CPCs are above a neighbor-ship threshold ThN. The default value is ThN=0 which simply allows any two cells that are potentially mobility neighbors to also have some Energy Saving (ES) relationship.

According to a Rule 2, two cells are candidate ES neighbors if one cell has a small CPC and the other cell has a large one, i.e. the absolute difference between the CPCs (here simply referred to as the CPC Difference, (CD)) is above a certain threshold (in particular, is above some high threshold). In other words, the cells have a macro-micro or micro-pico relationship among them. Their candidature for ESM increases however with the degree of overlap between them. Thus, the two have a perfect ESM relationship if the max CPC (i.e. the maximum value of the two CPCs as seen from each of the two considered cells) is high and the CPC Difference is high.

To apply the rule, a CPC Gradient (CG) is computed as a sum of the maximum CPC and the CPC Difference, and it is determined whether this sum is above a threshold ThG. If it is above a threshold ThG, the two cells have an ESM relationship in which the cell with the larger CPC is a candidate helper to the other cell. In such case, with respect to the candidate helper, the other cell is added to the list of its candidate reference cells.

According to a Rule 3, all cells without potential reference cells are themselves reference cells. Hence, according to exemplary embodiments of the present invention they are be labelled as reference cells and removed from the candidate hashes of the helper cells (the non-reference cells). If an example cell X is a helper to an example cell Y and cell Y is a helper to an example cell Z, cell X is not necessarily a helper to cell Z. Hence, according to exemplary embodiments of the present invention, such cells as cell X are removed from the candidate lists of cells such as cell Y to thereby avoid this confusion from occurring.

According to a Rule 4, a small cell is associated with the PSG whose reference (i.e. CG) is the largest among the small cell's candidate reference cells. In rare cases, there may be ties in that one small cell identifies two cells as potential reference cells with the same CPC Gradient. In order to resolve such situation, any appropriate tie breaking mechanism can be employed. According to exemplary embodiments of the present invention, a simple tie breaking mechanism would be to choose one of the tie reference cells at random. According to further exemplary embodiments of the present invention, it is considered how many other cells are available as potential helper cells to each of the two reference cells. The helper cell would then be associated with the more deficient reference cell. According to still further exemplary embodiments of the present invention, the typical traffic load in each of the reference cells is considered so that the helper cell is associated with the reference cell having a higher typical load level.

It is noted that according to exemplary embodiments of the present invention the above-mentioned rules may sometimes need to be applied iteratively, especially rule 4. Ties among the reference cells could, for example, be first broken randomly to complete the assignment. Then, after all cells are assigned, the ties may be revisited to adjust the association in consideration of e.g., the number of helper cells available in each PSGs and the degree of coupling (the CPC gradients) between the reference cells and their helper cells.

According to exemplary embodiments, the above-mentioned thresholds are set in advance in order to achieve intended results of the PSG autoconfiguration. However, although setting the suitable thresholds is important, it has been found that even using default thresholds will already deliver very good results although these can be improved by adjusting the thresholds as per the specific wishes of the operator.

Exemplary embodiments of the present invention are described in still more specific terms by means of an example.

Figure 7:
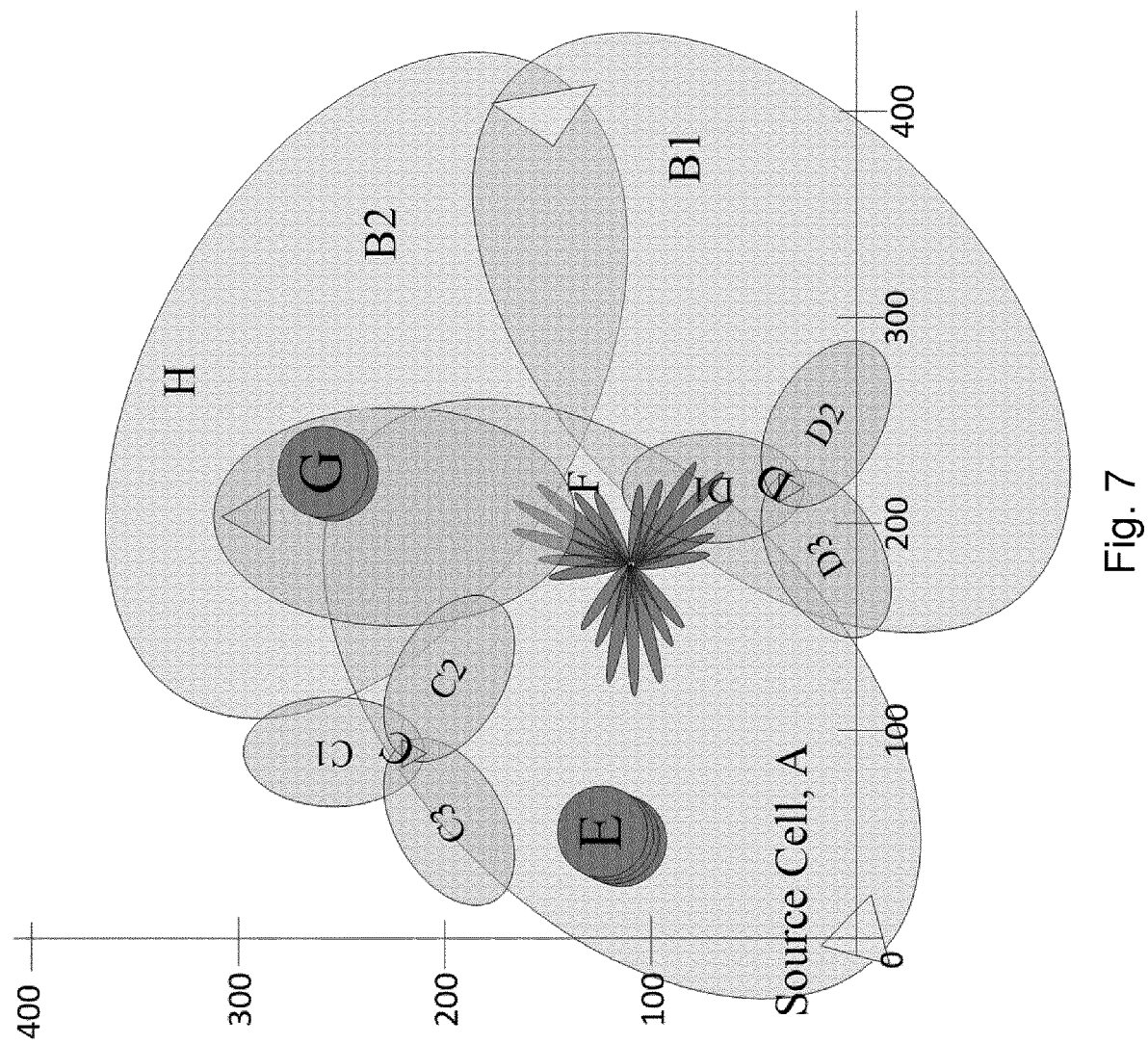
FIG. 7 shows a schematic diagram illustrating an example of heterogeneous networks.

For such example of the use of the invention, a network deployed as shown in FIG. 7 is considered, according to which a network with six cell sites including two 3G macro sites A[(0,0), 45°,400, 60° ] and B[(400,150), {210°,300° }, 400, 60° ]; two LTE outdoor sites C[(90,220), {0°,120°,240° }, 100, 60° ] and D[(220,40), {0°,120°,240° }, 100], 60° ]; a set of a 5G indoor cells E[(50,140), 0°, 50, 360° ] and G[(220,270), 0°, 50, 360° ] as well as 5G beamforming outdoor sites F[(200,130), {0°,120°,240° }, 75, 90° ] and H[(230,320), 180°, 200, 60° ] are arranged.

The CPCs (relative neighborliness/cell relationships) of the different cells and beams at the five sites (A, B, C, D, E, F) are computed as shown in the table below (illustrating a CPC (neighborliness) matrix among the different cells and beams in FIG. 7). For clarity of the results, each cell in F is assumed to have only three beams in the evaluation. The table provides numbers that respectively grade (describe) the neighborliness of each possible configuration/combination. The cells ("Cls") that are neighbors to each other (CPC>0) are indicated with the respective CPC while those which are not simply have a dash ("-").

| Cls | A | B1 | B2 | C1 | C2 | C3 | D1 | D2 | D3 | E1 | E2 | E3 | F1 | F2 | F3 | G | G2 | H |
|---|---|---|---|---|---|---|---|---|---|---|---|---|---|---|---|---|---|---|
| A | — | 28 | 23 | 12 | 21 | 20 | 17 | 5 | 17 | 12 | 12 | 12 | 16 | 15 | 19 | 11 | 11 | 23 |
| B1 | 28 | — | 7 | — | — | — | 25 | 25 | 21 | — | — | — | 19 | 19 | 12 | — | — | — |
| B2 | 23 | 7 | — | 12 | 17 | 5 | 2 | — | — | 9 | 9 | 9 | 19 | 13 | 19 | 12 | 12 | 38 |
| C1 | 48 | — | 47 | — | 14 | 14 | — | — | — | — | — | — | — | — | — | — | — | — |
| C2 | 84 | — | 66 | 14 | — | 14 | — | — | — | — | — | — | — | — | — | — | — | — |
| C3 | 78 | — | 21 | 14 | 14 | — | — | — | — | 28 | 28 | 28 | — | — | — | — | — | — |
| D1 | 68 | 100 | 9 | — | — | — | — | 31 | 31 | — | — | — | 1 | 36 | 17 | — | — | 10 |
| D2 | 20 | 100 | — | — | — | — | 31 | — | 31 | — | — | — | — | 7 | — | — | — | — |
| D3 | 66 | 82 | — | — | — | — | 31 | 31 | — | — | — | — | — | — | — | — | — | — |
| E1 | 100 | — | 75 | — | — | 55 | — | — | — | — | 100 | 100 | — | — | — | — | — | — |
| E2 | 100 | — | 75 | — | — | 55 | — | — | — | 100 | — | 100 | — | — | — | — | — | — |
| E3 | 100 | — | 75 | — | — | 55 | — | — | — | 100 | 100 | — | — | — | — | — | — | — |
| F1 | 85 | 100 | 100 | — | — | — | 1 | — | — | — | — | — | — | 31 | 31 | — | — | 29 |
| F2 | 78 | 100 | 70 | — | — | — | 47 | 9 | — | — | — | — | 31 | — | 31 | — | — | 11 |
| F3 | 100 | 62 | 100 | — | — | — | 22 | — | — | — | — | — | 31 | 31 | — | — | — | 55 |
| G1 | 85 | — | 100 | — | — | — | — | — | — | — | — | — | — | — | — | — | 100 | 100 |
| G2 | 85 | — | 100 | — | — | — | — | — | — | — | — | — | — | — | — | 100 | — | 100 |
| H | 46 | — | 76 | — | — | — | 5 | — | — | — | — | — | 11 | 4 | 20 | 25 | 25 | — |

With respect to the determination of the network representation (e.g. network graphing), the determination process (graphing process) firstly connects each cell to the other cell(s) in the network. That is, a fully connected graph of all the cells in the network is created.

However, initializing the graph with the rule that CPC of neighbor cells must be greater than 0, the graph would simplify to a CPC grid, in which, for example, cell C2 would be related to A and B2 but not to either of B1 or H.

With respect to the processing of the network representation (graph processing), when applying rule 1, all the edges represented by dashes in the table above (here with ThN=0) are removed from the graph. PSG relations are then only evaluated for those with CPC>ThN.

Further, when applying rule 2, computing the CPC gradient and maximum will identify all those cells with adequate overlap for ESM.

Then, for example, two neighbor macro cells (e.g. A and B1) will have a small max CPC (e.g. 28 for A and B1) and an even small difference (0 for A-B1). They will thus have a very low CPC Gradient (28 for A-B1).

Further, then, for example, two overlapping comparable cells (e.g. H and B2) will have a significant max CPC (e.g. 76 for H-B2) even if they have a small CPC difference (76−38=38 for H-B2). They will thus have a considerable CPC Gradient (114 for H-B2).

Further, then, for example, a small cell overlapping a larger cell will have a significant max CPC that depends on how much the larger cell covers the smaller cell (e.g. 84 for A-C2). However, even the difference will be high (84−21=63 for A-C2) indicating that the two have a good ESM relationship. They will thus have a high CPC Gradient (147 for A-C2).

According to exemplary embodiments of the present invention, for all cells a hash of candidate reference cells is populated. Corresponding hashes will be as shown in the table below (illustrating ESM reference cell candidate hashes for the cells in FIG. 7), which is ascertained for the case ThG=0.

| Candidate reference cells (ThG = 0) | | | | | | | | | | | |
|---|---|---|---|---|---|---|---|---|---|---|---|
| Cells: | cell | CG | cell | CG | cell | CG | cell | CG | cell | CG | cell | CG |
| A | | | | | | | | | | | | |
| B1 | | | | | | | | | | | | |
| B2 | | | | | | | | | | | | |
| C1 | A | 84 | B2 | 82 | | | | | | | | |
| C2 | A | 147 | B2 | 115 | | | | | | | | |
| C3 | A | 136 | B2 | 37 | | | | | | | | |
| D1 | A | 119 | B1 | 175 | B2 | 16 | H | 15 | | | | |
| D2 | A | 35 | B1 | 175 | | | | | | | | |
| D3 | A | 115 | B1 | 143 | | | | | | | | |
| E1 | A | 188 | B2 | 141 | C3 | 82 | | | | | | |
| E2 | A | 188 | B2 | 141 | C3 | 82 | | | | | | |
| E3 | A | 188 | B2 | 141 | C3 | 82 | | | | | | |
| F1 | A | 154 | B2 | 181 | B1 | 181 | H | 47 | | | | |
| F2 | A | 141 | B2 | 127 | B1 | 181 | D1 | 58 | D2 | 11 | H | 18 |
| F3 | A | 181 | B2 | 181 | B1 | 112 | H | 90 | D1 | 27 | | |
| G1 | A | 159 | B2 | 188 | H | 175 | | | | | | |
| G2 | A | 159 | B2 | 188 | H | 175 | | | | | | |
| H | A | 69 | B2 | 114 | | | | | | | | |

Further, when applying rule 3, cells A, B1 and B2 are recognized as reference cells and labelled as such. Non-reference cells are also identified as such and removed form candidate list. Note here that choosing a cell as being reference or not depends on the threshold ThG, which is set to ThG=0 for the table above.

For example, if ThG is set to ThG=100, cells A and B2 would be eliminated as candidate reference cells for cell C1, which then makes cell C1 a reference cell.

Two further tables are shown below for the cases that a ThG=50 and a ThG=100 would be considered.

| Candidate reference cells (ThG = 50) | | | | | | | | | | | |
|---|---|---|---|---|---|---|---|---|---|---|---|
| Cells: | cell | CG | cell | CG | cell | CG | cell | CG | cell | CG | cell | CG |
| A | | | | | | | | | | | | |
| B1 | | | | | | | | | | | | |
| B2 | | | | | | | | | | | | |
| C1 | A | 84 | B2 | 82 | | | | | | | | |
| C2 | A | 147 | B2 | 115 | | | | | | | | |
| C3 | A | 136 | | | | | | | | | | |
| D1 | A | 119 | B1 | 175 | | | | | | | | |
| D2 | B1 | 175 | | | | | | | | | | |
| D3 | A | 115 | B1 | 143 | | | | | | | | |
| E1 | A | 188 | B2 | 141 | C3 | 82 | | | | | | |
| E2 | A | 188 | B2 | 141 | C3 | 82 | | | | | | |
| E3 | A | 188 | B2 | 141 | C3 | 82 | | | | | | |
| F1 | A | 154 | B2 | 181 | B1 | 181 | | | | | | |
| F2 | A | 141 | B2 | 127 | B1 | 181 | D1 | 58 | | | | |
| F3 | A | 181 | B2 | 181 | B1 | 112 | H | 90 | | | | |
| G1 | A | 159 | B2 | 188 | H | 175 | | | | | | |
| G2 | A | 159 | B2 | 188 | H | 175 | | | | | | |
| H | A | 69 | B2 | 114 | | | | | | | | |

| Candidate reference cells (TheG = 100) | | | | | | | | | | | |
|---|---|---|---|---|---|---|---|---|---|---|---|
| Cells: | cell | CG | cell | CG | cell | CG | cell | CG | cell | CG | cell | CG |
| A | | | | | | | | | | | | |
| B1 | | | | | | | | | | | | |
| B2 | | | | | | | | | | | | |
| C1 | | | | | | | | | | | | |
| C2 | A | 147 | B2 | 115 | | | | | | | | |
| C3 | A | 136 | | | | | | | | | | |
| D1 | A | 119 | B1 | 175 | | | | | | | | |
| D2 | B1 | 175 | | | | | | | | | | |
| D3 | A | 115 | B1 | 143 | | | | | | | | |
| E1 | A | 188 | B2 | 141 | | | | | | | | |
| E2 | A | 188 | B2 | 141 | | | | | | | | |
| E3 | A | 188 | B2 | 141 | | | | | | | | |
| F1 | A | 154 | B2 | 181 | B1 | 181 | | | | | | |
| F2 | A | 141 | B2 | 127 | B1 | 181 | | | | | | |
| F3 | A | 181 | B2 | 181 | B1 | 112 | | | | | | |
| G1 | A | 159 | B2 | 188 | H | 175 | | | | | | |
| G2 | A | 159 | B2 | 188 | H | 175 | | | | | | |
| H | B2 | 114 | | | | | | | | | | |

When applying rule 4, the reference cell for each small cell (helper cell) is identified as the one with the highest CPC Gradient. According to exemplary embodiments of the present invention, the PSGs are the set of (helper) cells that identify a certain cell as their reference cell together with that reference cell. Correspondingly, for the cells in FIG. 7, the PSGs with ThG set to ThG=0 will be as in the table below (illustrating final PSGs for the network in FIG. 7).

| PSG No. | Reference cell | helper cells |
|---|---|---|
| 1 | A | C1, C2, C3, E1, E2, E3, F3 |
| 2 | B1 | D1, D2, D3, F1, F2 |
| 3 | B2 | F1, F3, G1, G2, H |

Correspondingly, for the cells in FIG. 7, the PSGs with ThG set to ThG=50 will be as in the table below (illustrating final PSGs for the network in FIG. 7).

| PSG No. | Reference cell | helper cells |
|---|---|---|
| 1 | A | C1, C2, C3, E1, E2, E3, F3 |
| 2 | B1 | D1, D2, D3, F1, F2 |
| 3 | B2 | F1, F3, G1, G2, H |

Correspondingly, for the cells in FIG. 7, the PSGs with ThG set to ThG=100 will be as in the table below (illustrating final PSGs for the network in FIG. 7). As mentioned above, in contrast to the other two thresholds ThG, setting ThG=100 would result in cell C1 being a reference cell.

| PSG No. | Reference cell | helper cells |
|---|---|---|
| 1 | A | C2, C3, E1, E2, E3, F3 |
| 2 | B1 | D1, D2, D3, F1, F2 |
| 3 | B2 | F1, F3, G1, G2, H |
| 4 | C1 | |

The tie e.g. for cells F1 and F3 (indicated in italic in the tables above) can be broken by any appropriate mechanism, as mentioned above.

Summarizing, according to exemplary embodiments of the present invention, the configuration of cells for energy saving management is simplified. The measures according to the present invention are accurate for all sort of neighbor relationships once a good estimate of their CPCs is given.

As the measures according to the present invention are elegant but not complex to understand, these can easily be implemented be it centrally or in a distributed from (e.g. for a subnetwork). Moreover, only minimal signaling is required, i.e., particularly the list/matrix of CPC values discussed above.

The computations according to exemplary embodiments of the present invention are not complex, i.e., even if it had to be computed multiple times at the base station, it would be manageable.

Finally, exemplary embodiments of the present invention allow a simple and intuitive but yet powerful method for processing cell associations on a (sub-) network level, including also the transitive dependencies between the different associations.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks. When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 8:
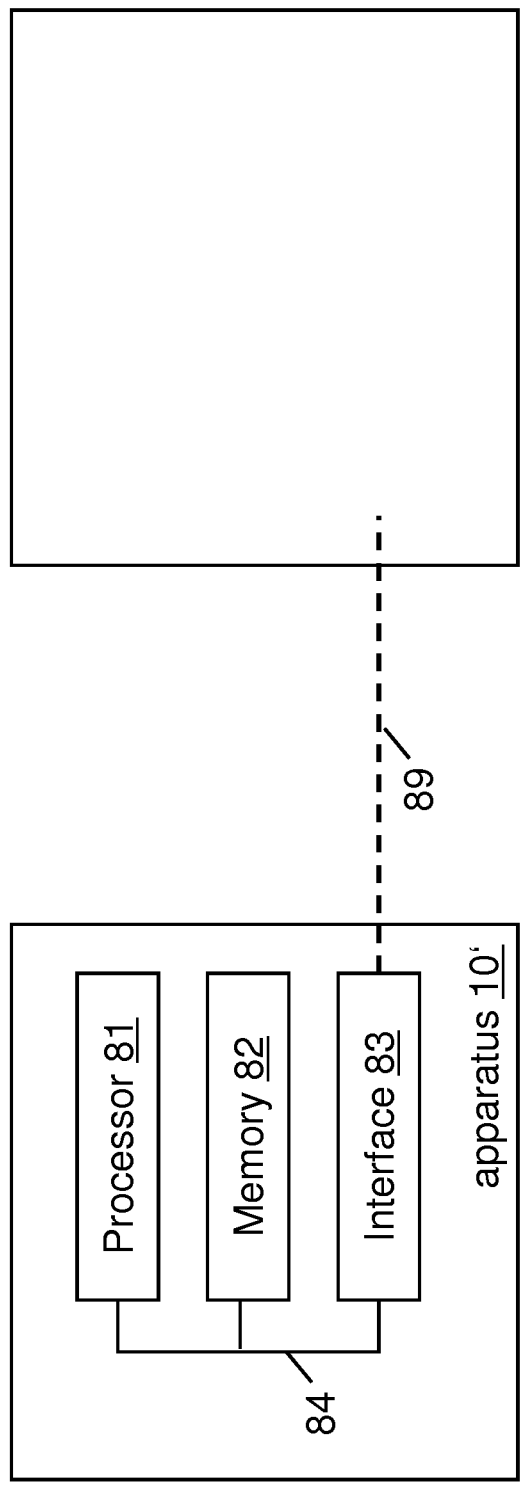
FIG. 8 is a block diagram alternatively illustrating apparatuses according to exemplary embodiments of the present invention.

In FIG. 8, an alternative illustration of apparatuses according to exemplary embodiments of the present invention is depicted. As indicated in FIG. 8, according to exemplary embodiments of the present invention, the apparatus (network node/element) 10' (corresponding to the apparatus 10) comprises a processor 81, a memory 82 and an interface 83, which are connected by a bus 84 or the like. The apparatuses may be connected to other apparatuses via link(s) 89, respectively.

The processor 81 and/or the interface 83 may also include a modem or the like to facilitate communication over a (hardwire or wireless) link, respectively. The interface 83 may include a suitable transceiver coupled to one or more antennas or communication means for (hardwire or wireless) communications with the linked or connected device(s), respectively. The interface 83 is generally configured to communicate with at least one other apparatus, i.e. the interface thereof.

The memory 82 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 comprises at least one processor 81, at least one memory 82 including computer program code, and at least one interface 83 configured for communication with at least another apparatus. The processor (i.e. the at least one processor 81, with the at least one memory 82 and the computer program code) is configured to, for determining, in a network including a plurality of radio cells, at least one power saving group comprising at least two radio cells of said plurality of radio cells, perform retrieving neighboring data including a plurality of entries corresponding to a plurality of combinations of respective two radio cells of said plurality of radio cells, wherein each of said plurality of entries represents overlapping amount information in relation to said respective two radio cells (thus the apparatus comprising corresponding means for retrieving), to perform identifying radio cells of said plurality of radio cells as power saving group reference cells based on said neighboring data (thus the apparatus comprising corresponding means for identifying), to perform identifying radio cells of said plurality of radio cells as power saving group helping cells respectively for at least one identified power saving group reference cell based on said neighboring data, and to perform assigning each of said identified power saving group helping cells to one of said identified power saving group reference cells based on said neighboring data (thus the apparatus comprising corresponding means for assigning). As mentioned above, each of said at least one power saving group comprises one of said identified power saving group reference cells and at least one identified power saving group helping cell assigned to said one of said identified power saving group reference cells.

For further details regarding the operability/functionality of the individual apparatuses, reference is made to the above description in connection with any one of FIGS. 1 to 7, respectively.

For the purpose of the present invention as described herein above, it should be noted that

- method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;
- an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for configuration of power saving groups. Such measures, for determining, in a network including a plurality of radio cells, at least one power saving group comprising at least two radio cells of said plurality of radio cells, exemplarily comprise retrieving neighboring data including a plurality of entries corresponding to a plurality of combinations of respective two radio cells of said plurality of radio cells, wherein each of said plurality of entries represents overlapping amount information in relation to said respective two radio cells, identifying radio cells of said plurality of radio cells as power saving group reference cells based on said neighboring data, identifying radio cells of said plurality of radio cells as power saving group helping cells respectively for at least one identified power saving group reference cell based on said neighboring data, and assigning each of said identified power saving group helping cells to one of said identified power saving group reference cells based on said neighboring data, wherein each of said at least one power saving group comprises one of said identified power saving group reference cells and at least one identified power saving group helping cell assigned to said one of said identified power saving group reference cells.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

List of Acronyms and Abbreviations

3GPP 3rd Generation Partnership Project
ANR Automatic Neighbor Relations

CD CPC Difference
CG CPC Gradient
CPC Cell Proximity Coupling
C-RAN Centralized Radio Access Network
ES Energy Saving
ESM Energy Saving Management
Hetnets heterogeneous networks
LOS Line of Sight
LTE Long Term Evolution
NM Network Management
NR Neighbor Relation(ship)
NRT Neighbor Relations Table
OAM Operations, Administration and Management
PSG power saving group
RAT radio access technology
UE User Equipment

The invention claimed is:

1. A method for determining, in a network including a plurality of radio cells, at least one power saving group comprising at least two radio cells of said plurality of radio cells, the method comprising:
　　retrieving neighboring data including a plurality of entries corresponding to a plurality of combinations of respective two radio cells of said plurality of radio cells, wherein each of said plurality of entries represents overlapping amount information in relation to said respective two radio cells,
　　comparing, for each pair of two radio cells, each of two overlapping amount information elements corresponding to the respective pair of two radio cells with a neighborhood determination threshold (ThN),
　　determining, if at least one of said two overlapping amount information elements is larger than said neighborhood determination threshold (ThN), said respective two radio cells as neighbor radio cells,
　　calculating, for each pair of two neighbor radio cells, an absolute value of a difference between the two overlapping amount information elements corresponding to the respective pair of two neighbor radio cells as an overlapping amount difference,
　　comparing, for each pair of two neighbor radio cells, said respective overlapping amount difference with a power saving candidate determination threshold,
　　determining, if said respective overlapping amount difference is larger than said power saving candidate determination threshold, said respective two neighbor radio cells as power saving candidate radio cells,
　　determining, for each pair of two power saving candidate radio cells, a maximum overlapping amount information element of the two overlapping amount information elements corresponding to the respective pair of two power saving candidate radio cells,
　　computing a sum of the respective maximum overlapping amount information element and the respective overlapping amount difference as an overlapping amount gradient,
　　comparing the respective overlapping amount gradient with a power saving group candidate determination threshold (ThG),
　　determining, if said respective overlapping amount gradient is larger than said power saving group candidate determination threshold (ThG), said respective two neighbor radio cells as power saving group candidate radio cells,
　　identifying radio cells of said power saving group candidate radio cells as power saving group reference cells based on said neighboring data,
　　identifying radio cells of said power saving group candidate radio cells as power saving group helping cells respectively for at least one identified power saving group reference cell based on said neighboring data, and
　　assigning each of said identified power saving group helping cells to one of said identified power saving group reference cells based on said neighboring data, wherein each of said at least one power saving group comprises one of said identified power saving group reference cells and at least one identified power saving group helping cell assigned to said one of said identified power saving group reference cells.

2. The method according to claim 1, wherein said retrieving comprises accessing said neighboring data stored in a storing unit.

3. The method according to claim 1, further comprising declaring, for each pair of two power saving group candidate radio cells, the power saving group candidate radio cell corresponding to the larger overlapping amount information element of the respective two overlapping amount information elements as a power saving group reference cell candidate of said respective pair of two power saving group candidate radio cells and the power saving group candidate radio cell corresponding to the smaller overlapping amount information element of the respective two overlapping amount information elements as a power saving group helping cell candidate of said respective pair of two power saving group candidate radio cells.

4. The method according to claim 1, wherein in relation to said identifying as power saving group reference cells, the method further comprises
　　selecting, from power saving group reference cell candidates, power saving group candidate radio cells which are not declared as a power saving group helping cell candidate of any pair of two power saving group candidate radio cells, as a power saving group reference cell.

5. The method according to claim 1, wherein in relation to said identifying as power saving group helping cells, the method further comprises selecting power saving group candidate radio cells which are not selected as a power saving group reference cell as a power saving group helping cell of said respective pair of two power saving group candidate radio cells.

6. The method according to claim 1, wherein in relation to said assigning, the method further comprises ascertaining, for each power saving group helping cell, the power saving group reference cell corresponding to the pair of said respective power saving group helping cell and said respective power saving group reference cell for which the computed overlapping amount gradient is highest, and allocating said respective power saving group helping cell to said ascertained power saving group reference cell.

7. The method according to claim 6, wherein in relation to said ascertaining, the method further comprises declaring, if there are more than one pair of said respective power saving group helping cell and respective power saving group reference cells having the same highest computed overlapping amount gradient, the power saving group reference cell corresponding to one pair of the more than one pair of said respective power saving group helping cell and said respective power saving group reference cells having the same highest computed overlapping amount gradient based on at least one of a random determination,
a number of power saving group helping cells associated with each of the respective power saving group reference cells of the more than one pair of said respective power saving group helping cell and said respective power saving group reference cells having the same highest computed overlapping amount gradient, and
a traffic load expected for each of the respective power saving group reference cells of the more than one pair of said respective power saving group helping cell and said respective power saving group reference cells having the same highest computed overlapping amount gradient.

8. The method according to claim 1, wherein said overlapping amount information is indicative of a portion of a geographical coverage of one cell of said respective two radio cells which is overlapped with a geographical coverage of the other cell of said respective two radio cells.

9. The method according to claim 1, wherein said overlapping amount information is determined based on at least one of respective locations of said respective two radio cells, respective azimuths of said respective two radio cells, respective ranges of said respective two radio cells, respective antenna heights of said respective two radio cells, and respective transmit powers of said respective two radio cells.

10. An apparatus for determining, in a network including a plurality of radio cells, at least one power saving group comprising at least two radio cells of said plurality of radio cells, the apparatus comprising:
at least one processor,
at least one memory including computer program code, and
at least one interface configured for communication with at least another apparatus, the at least one processor, with the at least one memory and the computer program code, being configured to cause the apparatus to perform:
retrieving neighboring data including a plurality of entries corresponding to a plurality of combinations of respective two radio cells of said plurality of radio cells, wherein each of said plurality of entries represents overlapping amount information in relation to said respective two radio cells,
comparing, for each pair of two radio cells, each of two overlapping amount information elements corresponding to the respective pair of two radio cells with a neighborhood determination threshold (ThN),
determining, if at least one of said two overlapping amount information elements is larger than said neighborhood determination threshold (ThN), said respective two radio cells as neighbor radio cells,
calculating, for each pair of two neighbor radio cells, an absolute value of a difference between the two overlapping amount information elements corresponding to the respective pair of two neighbor radio cells as an overlapping amount difference,
comparing, for each pair of two neighbor radio cells, said respective overlapping amount difference with a power saving candidate determination threshold,
determining, if said respective overlapping amount difference is larger than said power saving candidate determination threshold, said respective two neighbor radio cells as power saving candidate radio cells,
determining, for each pair of two power saving candidate radio cells, a maximum overlapping amount information element of the two overlapping amount information elements corresponding to the respective pair of two power saving candidate radio cells,
computing a sum of the respective maximum overlapping amount information element and the respective overlapping amount difference as an overlapping amount gradient,
comparing the respective overlapping amount gradient with a power saving group candidate determination threshold (ThG),
determining, if said respective overlapping amount gradient is larger than said power saving group candidate determination threshold (ThG), said respective two neighbor radio cells as power saving group candidate radio cells,
identifying radio cells of said power saving group candidate radio cells as power saving group reference cells based on said neighboring data,
identifying radio cells of said power saving group candidate radio cells as power saving group helping cells respectively for at least one identified power saving group reference cell based on said neighboring data, and
assigning each of said identified power saving group helping cells to one of said identified power saving group reference cells based on said neighboring data, wherein each of said at least one power saving group comprises one of said identified power saving group reference cells and at least one identified power saving group helping cell assigned to said one of said identified power saving group reference cells.

11. The apparatus according to claim 10, wherein in relation to said retrieving, the at least one processor, with the at least one memory and the computer program code, being configured to cause the apparatus to perform:
accessing said neighboring data stored in a storing unit.

12. The apparatus according to claim 10, wherein the at least one processor, with the at least one memory and the computer program code, being configured to cause the apparatus to perform:
declaring, for each pair of two power saving group candidate radio cells, the power saving group candidate radio cell corresponding to the larger overlapping amount information element of the respective two overlapping amount information elements as a power saving group reference cell candidate of said respective pair of two power saving group candidate radio cells and the power saving group candidate radio cell corresponding to the smaller overlapping amount information element of the respective two overlapping amount information elements as a power saving group helping cell candidate of said respective pair of two power saving group candidate radio cells.

13. The apparatus according to claim 12, wherein in relation to said identifying as power saving group reference cells, the at least one processor, with the at least one memory and the computer program code, being configured to cause the apparatus to perform:
selecting, from power saving group reference cell candidates, power saving group candidate radio cells which are not declared as a power saving group helping cell candidate of any pair of two power saving group candidate radio cells, as a power saving group reference cell.

14. The apparatus according to claim 13, wherein in relation to said identifying as power saving group helping cells, the at least one processor, with the at least one memory and the computer program code, being configured to cause the apparatus to perform:

selecting power saving group candidate radio cells which are not selected as a power saving group reference cell as a power saving group helping cell of said respective pair of two power saving group candidate radio cells.

15. An apparatus for determining, in a network including a plurality of radio cells, at least one power saving group comprising at least two radio cells of said plurality of radio cells, the apparatus comprising:

at least one processor, at least one memory including computer program code, and at least one interface configured for communication with at least another apparatus, the at least one processor, with the at least one memory and the computer program code, being configured to cause the apparatus to perform:

retrieving neighboring data including a plurality of entries corresponding to a plurality of combinations of respective two radio cells of said plurality of radio cells, wherein each of said plurality of entries represents overlapping amount information in relation to said respective two radio cells, comparing, for a pair of two power saving candidate radio cells of said at least two radio cells, a respective overlapping amount gradient with a power saving group candidate determination threshold (ThG), wherein said pair of two power saving candidate radio cells is identified in response to at least one of two overlapping amount information elements corresponding to the respective pair of two radio cells being larger than a neighborhood determination threshold (ThN) and an absolute value of a difference between said two overlapping amount information elements being larger than a power saving candidate determination threshold, and wherein the respective overlapping amount gradient is indicative of a sum of a respective maximum overlapping amount information element of said two overlapping amount information elements and the respective overlapping amount difference, in response to said respective overlapping amount gradient being larger than said power saving group candidate determination threshold (ThG), determining said respective two neighbor radio cells as power saving group candidate radio cells, identifying radio cells of said power saving group candidate radio cells as power saving group reference cells based on said neighboring data, identifying radio cells of said power saving group candidate radio cells as power saving group helping cells respectively for at least one identified power saving group reference cell based on said neighboring data, and assigning each of said identified power saving group helping cells to one of said identified power saving group reference cells based on said neighboring data, wherein each of said at least one power saving group comprises one of said identified power saving group reference cells and at least one identified power saving group helping cell assigned to said one of said identified power saving group reference cells, wherein said assigning includes ascertaining, for each power saving group helping cell, the power saving group reference cell corresponding to the pair of said respective power saving group helping cell and said respective power saving group reference cell for which the computed overlapping amount gradient is highest, and allocating said respective power saving group helping cell to said ascertained power saving group reference cell.

* * * * *